United States Patent

Murphy et al.

Patent Number: 5,340,198
Date of Patent: Aug. 23, 1994

[54] SEAT BELT ADJUSTMENT DEVICE

[76] Inventors: Joseph F. Murphy, 39 Washington St., Apt. 6, Concord, N.H. 03301-4209; Michael J. McGeehan, 309 Pegasus Rd., Piscataway, N.J. 08854; Gregory A. Benske, 4728 Amber Cir., Hoffman Estates, Ill. 60195; Juan Gaudiano, P.O. Box 1912 Zone 1, Panama, Panama

[21] Appl. No.: 754,920

[22] Filed: Sep. 5, 1991

[51] Int. Cl.⁵ .............................................. B60R 22/10
[52] U.S. Cl. ................................... 297/483; 280/808
[58] Field of Search .................. 297/483, 468; 280/808

[56] References Cited

U.S. PATENT DOCUMENTS

| | | | |
|---|---|---|---|
| 3,860,261 | 1/1975 | Takada | 297/483 X |
| 4,236,755 | 12/1980 | Pollitt et al. | 297/483 |
| 4,289,352 | 9/1981 | Ashworth | 297/473 |
| 4,640,550 | 2/1987 | Hkansson et al. | 297/483 |
| 4,786,078 | 11/1988 | Schreier et al. | 297/483 X |
| 4,796,919 | 1/1989 | Linden | 280/808 |
| 4,799,737 | 1/1989 | Greene | 297/468 |
| 4,832,367 | 5/1989 | Lisenby | 280/808 |
| 4,893,835 | 1/1990 | Linden | 297/483 X |
| 4,938,535 | 7/1990 | Condon et al. | 297/483 |
| 5,042,838 | 8/1991 | Carter | 280/808 |
| 5,080,396 | 1/1992 | Vacanti | 280/808 |
| 5,088,161 | 2/1992 | Robertson | 297/483 X |
| 5,135,257 | 8/1992 | Short | 280/808 |

FOREIGN PATENT DOCUMENTS

| | | | |
|---|---|---|---|
| 2536665 | 3/1977 | Fed. Rep. of Germany | 297/483 |
| 2369948 | 7/1978 | France | 297/483 |

OTHER PUBLICATIONS

"The Way Things Work", p. 79, by D. Macauly, Houghtan Mifflin, Boston, 1979.
Federal Register, vol. 57, No. 104, May 29, 1992, pp. 22687–22695.

Primary Examiner—Peter R. Brown

[57] ABSTRACT

A safety belt adjustment device and a safety belt system are disclosed in which an automobile shoulder belt is adjusted by a device mountable on the shoulder belt itself engages the belt so as to reduce the angle at which the belt crosses the passenger's chest, thereby lowering the point at which the belt crosses the center of the passenger's chest, thus allowing the shoulder belt to be safely and comfortably used by people who, for physical reasons such as shortness, would otherwise be unable to use the shoulder belt.

11 Claims, 5 Drawing Sheets

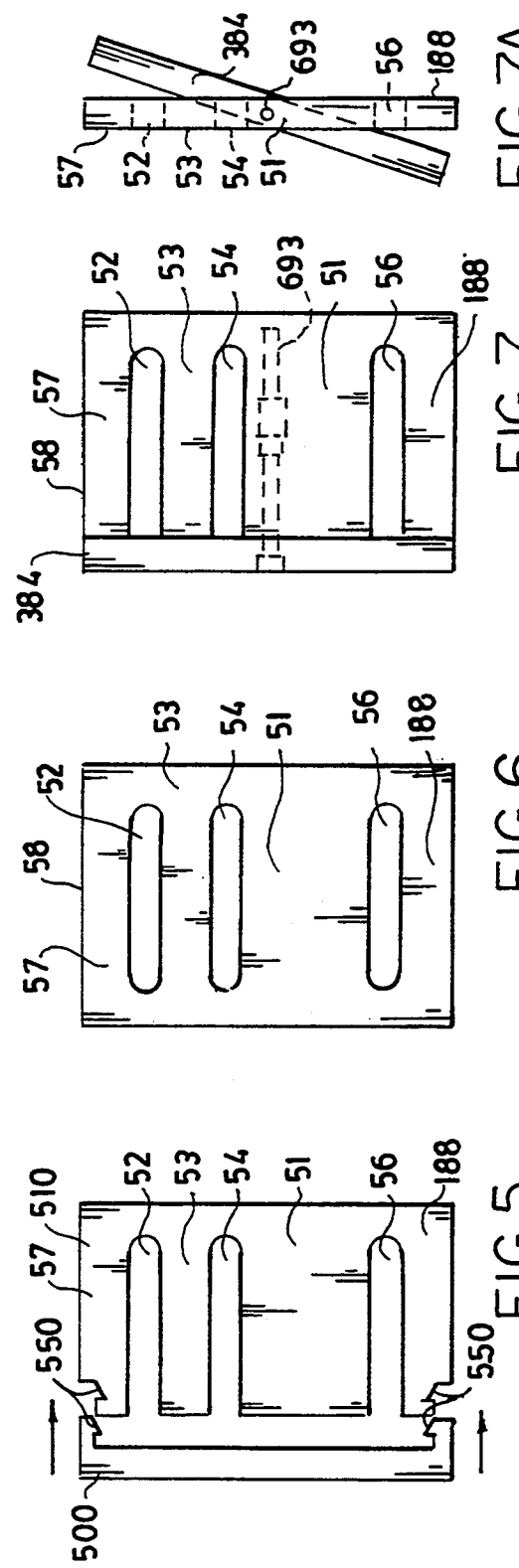

SEAT BELT ADJUSTMENT DEVICE

BACKGROUND OF THE INVENTION

1) Field of the Invention

This invention relates to automobile passenger protection, and specifically, is a method and apparatus for modifying and adjusting existing shoulder belts to fit passengers who are currently unable to wear them.

2) Discussion of Prior Art

Standard three-point automobile seat belts are only designed to restrain a passenger of average adult size. The shoulder portion crosses the passenger seat, and hence the body of the passenger seated thereon, at a location which is fixed in relation to the passenger seat, not to the passenger. The crossover point is not always properly over the center of the passenger's breastbone, a.k.a. the mesosternum. In fact, this crossover point may even be over the neck or face of a passenger of below average height or size. The result is that such a passenger, e.g., a child, is unable to use standard shoulder belts. It has been thought desirable to adjust the position of the belt and/or passenger so that the shoulder belt would properly cross the mesosternum, and permit the passenger to wear a shoulder belt.

Some devices of the prior art has attempted to lower the shoulder belt crossover point by lowering the "vertical transition point", the point from which the shoulder portion of the belt turns and proceeds diagonally across the passenger. The position of this point is originally located at the "vertical transition member", which is the hardware member, typically a D-ring, to which the shoulder portion of the belt rises and meets the vertical portion of the belt. This vertical transition member is typically mounted in the car's interior near the passenger's shoulder. Providing means to move the vertical transition point by moving the actual vertical transition member necessarily required a substantial modification of the vehicle interior. Hence, such prior art devices could not be used on existing automobiles. Furthermore, they are a cumbersome solution to the problem.

Other prior art attempts attempted to lower the vertical transition point, and hence the point at which the shoulder belt crossed the occupant's chest, without moving the actual vertical transition member. One such approach is shown by Pollitt's U.S. Pat. No. 4,236,755, and Ashworth's U.S. Pat. No. 4,289,352. These provide, along with the standard safety belts, an additional belt mounted about or adjacent to the seat. Further provided is a deflection member, which is adjustably mounted on the belt. The shoulder belt may be deflectively adjusted by the deflection member so as to better cross the occupant's chest. A strong disadvantage shared by Ashworth's and Pollitt's apparatuses is that they each require adding an additional separate, independent belt to the car, upon which their deflection member is mounted. Thus, they cannot use existing belts, but require either retrofitting existing automobiles or redesigning future automobiles to include the extra parts. Furthermore, the deflection members utilized by Ashworth and Pollitt lack a superior means for being securely, yet adjustably, mounted to the belt supporting them, as well as means for optimal torsional positioning of the shoulder belt which they are deflecting so as to lay flat as possible in fullest desired contact with occupant. Furthermore, the devices taught are not substantially co-planar with the interior automobile and belt surfaces, and hence present an additional hazard to the user.

Thus, nothing in the prior art shows, teaches, or suggests the present invention, especially of its: (1) providing a method and means of adjusting the point at which the shoulder belt crosses the passenger by lowering the effective upper end of the diagonal portion of the seat belt by deflecting it towards the vertical portion of the belt itself with a device that is itself frictionally and mechanically bound to the vertical portion of the belt and held to thereby, and (2) providing belt adjustment means which are mounted on the vertical portion of the belt and which engage the shoulder portion of the belt and which are used by sliding them up and down on the vertical portion of the belt so as to raise and lower the effective connection of the shoulder belt to the vertical portion of the belt, and also so as to raise and lower the effective height of the point from which the shoulder belt proceeds diagonally downward and also to raise and lower the point at which the shoulder belt crosses the passenger.

The present invention overcomes the disadvantages of the prior art, and has numerous objects and advantages which will become apparent from the drawings and the ensuing description.

OBJECTS OF THE INVENTION

It is a principal object of the present invention to provide a method and means for adjusting standard three-point auto seat belts, and particularly the shoulder belt, to fit passengers of other than average adult height. It is a further object of the invention to adjust standard seat belts to restrain children of all sizes, particularly those who are too big to use infant seats yet too small to use standard seat belts. Further objects of the invention are:

(a) to provide a device for variably adjusting seat belts to allow for the growth of children, or for the use by different people;

(b) to provide a device which allows adjustability of the belt and device which uses belt forces to lock the device securely in place upon a sudden stop or collision;

(c) to provide a device which is easily installable, and which does not require substantial modification of the existing seat belt assembly in order to operate;

(d) to provide a device comprising auxiliary belt locking means should the inertia reel mechanism on the belt retractor means fail to lock the belt in a collision;

(e) to provide a device which will accomplish the above-described adjustments by means which are readily adaptable to, and usable with, existing seat belt systems, as well as ones which are likely to be developed in the future;

(f) to provide a device which will accomplish the above-described adjustments by means which do not interfere with use of the seat belt by an average-size adult already able to use standard belts.

(g) To provide means for torsionally adjusting the position of a shoulder belt such that it will lay more flat against an occupant's chest;

(h) to provide a method and means of adjusting the point at which the shoulder belt crosses the passenger by lowering the effective upper end of the diagonal portion of the seat belt by anchoring it to the vertical section with a device that is frictionally and mechanically bound to the vertical portion of the belt and held to thereby.

(i) to provide means for adjusting the belt which may be assembled about the existing belt itself, and hence are easily mounted.

Still further objects and advantages will become apparent from a consideration of the ensuing description and drawings.

SUMMARY OF THE INVENTION

Modern automobile seat belts are of the three-point type, consisting of a lap portion, a shoulder portion, and a vertical portion. In use, the belt's path forms what is substantially a right triangle, with the three sides formed by the lap portion, shoulder belt portion and vertical portion of the belt, and the three vertices being a first floor anchoring point, the belt buckle, and a vertical deflection member, typically a D-ring type structure. More specifically, the lap portion, running from an anchoring point on the floor, across the lap, to a buckle, forms the base of the triangle; the shoulder belt portion, running from the buckle, across the wearer's chest, and into and through the vertical deflection member, forms the hypotenuse; a vertical portion section of the belt, running from the vertical deflection member to a second anchoring point at the floor, forms the third side of the triangle. A shoulder belt should cross a wearer's body at the center of the breastbone, i.e., the mesosternum, which is strong enough to withstand the force the body feels against the shoulder belt in a crash. For a seated person of average height, the mesosternum is located approximately sixteen inches above the seat. Accordingly, a standard seatbelt is designed to cross the center of the seat back, and hence the center of a passenger seated thereagainst, at a point approximately 16 inches above the seat. This will enable the average person to wear a shoulder belt.

For a seated passenger of below average height, however, a point sixteen inches above the seat may lie, not on the mesosternum, but across the face, across the neck, or even above the head. Such people cannot use seat belts, and particularly shoulder belts; not only are they not protected by them, they can be seriously injured by them.

The method and apparatus of the present invention lowers the point at which the shoulder belt crosses a passenger's body by lowering the effective connection point of the shoulder portion of the belt to the vertical portion of the belt and the effective point from which the shoulder belt proceeds diagonally downward across the occupant's chest. Put another way, the method and apparatus of the present invention, using means mounted on the belt itself, effectively lowers the height of the vertical transition point, at the vertical transition member. This essentially reduces the height of the triangle formed by the three-point belt, and thereby lowers the crossover point from its standard location sixteen inches above the seat to a point, perhaps between twelve and sixteen inches above the seat, which is on the (undersized) passenger's mesosternum Thus, the present invention permits the passenger to safely wear a standard shoulder belt.

The present invention comprises mounting means and deflection means. The mounting means provided adjustably engage the vertical belt portion at an adjustable point, typically below the vertical deflection member and approximately slightly higher than the passenger's shoulder. In the mounting means of a preferred embodiment, the vertical portion of the belt is engaged by the mounting means in serpentine fashion, forming a loop therein. The loop may have turns in it so acute as to form sub-loop runs which are substantially antiparallel to the vertical portion of the belt, as well as a loop run which is parallel to the vertical portion of the belt. This serpentine or "zig-zag" mounting means affords the present device an effective mount on the belt itself. Such mounting means also permit movement of the device during conditions of normal belt tension, when it may be manually slid up or down the vertical portion of the belt. Furthermore, the mounting means prevent movement of the device during the conditions of greatly increased belt tension which exist during a collision or rapid vehicle stop, by using belt forces tending to pull the belt taut to lock the mounting means tighter in place on the belt, which itself is held fixed from reeling out further by an inertia belt reel lock standard in cars and familiar to those familiar with the art. Thus, the mounting means of the present invention form an even more secure attachment point when that security is most needed. Accordingly, though the device is not fixed to the car body, and is in fact adjustable, it may be considered to be a fixed point.

The deflection means, which are connected to the mounting means, deflectively engages the shoulder belt in a manner similar to that of the vertical transition member, and operates to determine the effective location of the vertical transition point, and of the connection between the shoulder belt portion and vertical belt. The deflection means are adjustably locatable along the vertical belt portion. The deflection means also may comprise means for torsionally orienting the belt so that it will lay flat against the passenger's chest.

The deflection means of the device thus comprises an effective vertical transition member, in that it provides the point from which the vertical belt portion is deflected to, and connected to, the shoulder belt portion, thereby determining the apex of the triangle formed by the vertical belt portion and shoulder belt portion, i.e., the point from which the belt begins its path diagonally downwards across the passenger's chest.

In most three-point belt system the vertical deflection point is fixed at the vertical deflection member, i.e., the highest point of the vertical and shoulder portions of the belt, where the shoulder and vertical portions meet. With the device in operation, however, the effective location of the vertical transition point is no longer determined by the position of the vertical transition member, but is determined by the location of the device, and particularly its belt deflection means, along the vertical portion of the belt. Note that this location may be near the top of the vertical portion of the belt, as for an average adult, or substantially below the top of the vertical portion of the belt, as for a smaller individual. The device is used by raising or lowering it along the vertical portion of the belt, thus raising or lowering the effective connection between the shoulder belt portion and vertical belt portion, the height of the triangle formed by the shoulder and vertical belt portions, the point from which the shoulder belt proceeds diagonally downward across the chest of the passenger, and the crossover point at which the shoulder belt portion crosses the occupant's chest. For clarity, the device's deflection means may be said to comprise a "virtual vertical deflection member" which is an adjustable effective equivalent of the vertical transition member.

Once installed, the device according to the present invention permits ordinary use of the belt by adults, children, or others who are unable to use them for physical reasons which include, but are not limited to, below-average height, an unusual fullness or position of bust, or a physical handicap or deformity.

In summary: The device of the present invention is mountable directly on the belt itself, and adjusts the point at which the shoulder belt crosses the passenger's chest. The device lowers the effective upper end of the diagonal shoulder belt portion of the seatbelt by deflecting it towards the vertical section via its deflection means, which deflect the path of the shoulder portion. The device comprises mounting means which frictionally and mechanically bind against the vertical belt portion to safely and securely mount the device. The device is adjusted by sliding it up and down the vertical belt portion. For a short passenger, the present invention may lower the effective upper end of the diagonal portion of the seatbelt, and thereby the path the shoulder belt portion takes across the chest, and particularly the crossover point at which the shoulder belt crosses the center of the passenger's body, from the standard crossover point sixteen inches above the seat to any point twelve to sixteen inches above the seat cushion-or at whatever height the particular passenger's mesosternum happens to be.

BRIEF DESCRIPTION OF THE DRAWINGS

FIG. 3A is a front view of a preferred embodiment of the device.

FIG. 4 is a front view of another embodiment of the device.

FIG. 5 shows a front view of one embodiment of the device.

FIG. 6 shows a front view of another embodiment of the device

FIG. 7 shows a front view of yet another embodiment of the device.

FIG. 7A shows a side view of FIG. 7's embodiment of the device.

DETAILED DESCRIPTION OF THE PREFERRED EMBODIMENTS

Figure 3:
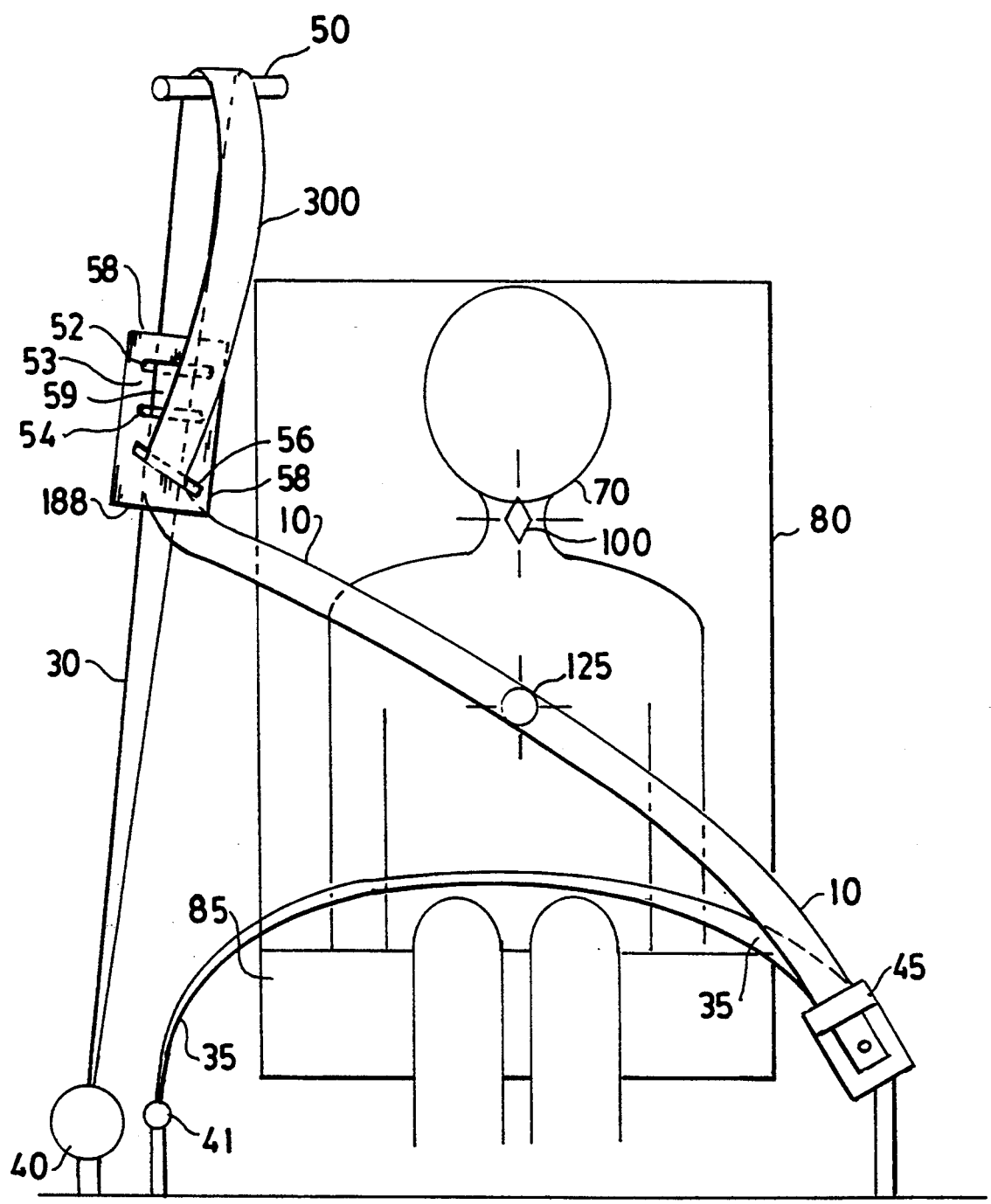
FIG. 3 shows a three-point belt system in use with the device of the present invention.

The device of the present invention is shown in various forms in FIGS. 3–6. Its operation and use along with the method of the present invention is best understood by referring to the side view shown in FIG. 1. In operation, the device is mounted directly onto the shoulder belt, as shown in FIG. 3

Figure 2:
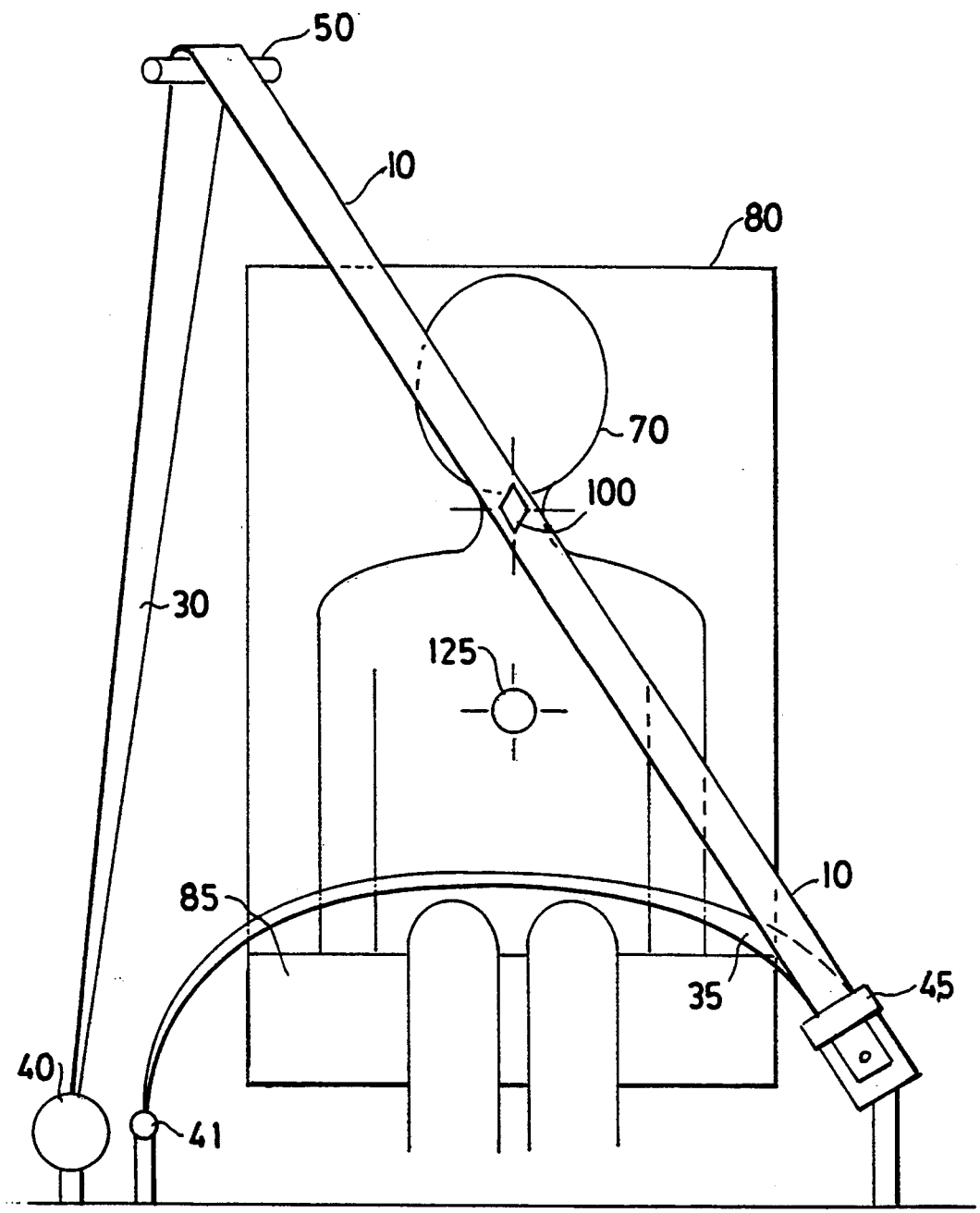
FIG. 2 shows a three-point belt system in use without the device of the present invention.

FIG. 3 also shows first belt guide member, a.k.a. vertical transition member 50, as well as shoulder belt length 10 and device 58 installed and adjusted, as according to the method of the present invention herein explained, on the belt below first belt guide member 50. The belt passes through apertures 52, 54, and 56, as shown in FIG. 2. The device 58 has effectively lowered the point at which the shoulder belt crosses the occupant's chest. Accordingly, note that the mesosternum 90 of this passenger is now properly crossed by the shoulder belt.

FIG. 3 shows the device 58, installed on the shoulder belt. The shoulder belt portion 10 rises from a buckle at a lower first point 45 at a first side relative to the passenger seat 80, no longer to vertical transition member 50, but to the effective vertical transition point and member provided by deflection means 56 of device 58. Note that this shoulder belt portion path places crossover point 125 atop the center of the chest of occupant 80, properly restraining him. Deflection means 56 of device 58 deflect the shoulder belt portion 10 upwardly as antivertical belt portion 300, into vertical transition member 50. Vertical belt portion 30 extends downwardly from vertical transition member 50 to belt anchoring point 40. Device mounting means 52, 53, 54, 57, and 59, and parts associated therewith, frictionally and mechanically engage the vertical belt portion 30 at a point along vertical belt portion 30, between vertical transition member 50 also referred to as first belt guide member 50 and belt anchoring point 40, which may comprise reel retractor means and associated inertia reel locks, as common in the art. While, in FIG. 3, the mounting means are depicted as being above that of deflection means, one skilled in the art will readily see that it may be adjacent said deflection means, or above it, as it would be if the device were inverted. Vertical transition point or member is at first belt guide member 50 mounted to the body of said vehicle at said second point. A section of the belt 30 continues the path of belt section 10 by continuing down from the first belt guide member 50 to a belt anchoring point 40. Note that, if the device is being implemented in a system which comprises a lap belt, a lap belt 35, which may or may not be integral with the shoulder belt portion 10, will typically extend from a belt anchoring point 41, which may be integral or adjacent said belt anchoring point 40, across the occupant's lap to said lower first point 45.

Thus, the device 58 changes the path of the shoulder belt portion 10 from its original traverse between the buckle at lower first point 45 and vertical transition member 50, to a new traverse between the buckle at lower first point 45, to deflection means 56 of device 58, thereby crossing the center of the chest of occupant 80.

Figure 1:
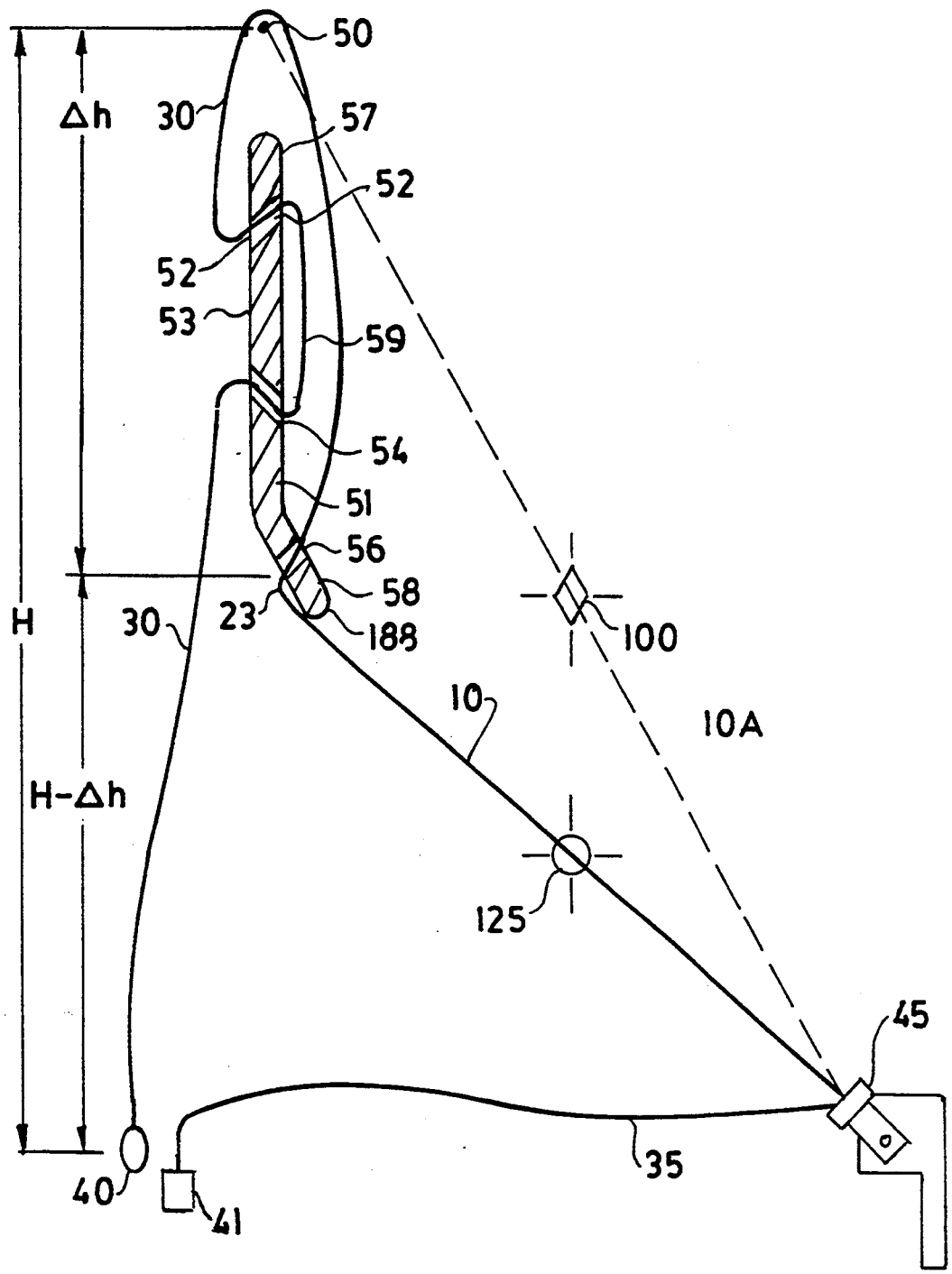
FIG. 1 shows a schematic side view of the belt path for the lap, shoulder, vertical portions of the belt, with the device of the present invention in place.

FIG. 1 shows in schematic side view detail of the passage of the belt through device 58. Understanding of the operation of the device is especially aided by referring to FIG. 1 and also to FIG. 2, FIG. 3 Note that the vertical belt portion belt 30 passes through device mounting means which comprise belt guide channel means 52 and 54, and belt binding member means 53 and through associated portions of the device, including belt binding member 53, upper mounting member 57, and lower mounting member 51, thus forming belt loop 59. This loop 59 and its action with device mounting means support the device at a point intermediate to belt anchoring means 40 and first belt guide member 50. The static friction and mechanical coupling of device 58, and particularly its belt channels 52 and 54, and upper and lower mounting members 51 and 53, associated therewith, together with the belt loop 59 hold the device in place on the belt during conditions of ordinary belt tension, such as are present at times other than during a collision. The increased belt tension of a collision will tend to straighten belt loop 59 by pulling belt between points 40 and 50, which will be frictionally and mechanically bound tighter about device 58, especially about belt binding member 53, which will act with belt guide channels 52, 54 to hold device onto belt. Thus, the mounting means, particularly channels 52,54 and belt binding member 53, hold the device rigidly in place during a collision. These mounting means also permit the method of the present invention of adjustment and movement of device 58 along vertical belt portion 30 by manually loosening and enlarging belt loop 59 and sliding the device 58 up or down to a new position, then tightening belt loop 59.

Further, it is seen that deflection means comprising belt deflection guide channel 56, together with the end 188 and associated portions of the device 58, deflectively engage the shoulder belt portion 10 at a new virtual effective vertical transition point 23 located a distance Delta H below the original vertical transition point at vertical belt guide member 50, thereby deflecting the belt's path between the buckle at lower first point 45 and vertical transition point 50 and effectively lowering the point 125 at which the shoulder belt crosses the vertical centerline of the body of occupant 80 to a point 90, as shown in FIG. 3.

FIG. 2 shows a passenger 70 who is too short to use the seat belt buckled into a seat 80. Note that the mesosternum 90 of this passenger, located at the center of his sternum, is not crossed by the shoulder belt.

FIG. 3 shows a passenger 70 who is heretofore too short to use the seat belt but who is buckled into a seat 80 via device 58 of the present invention. Many parts of the invention and associated belt system are clearly shown, as are the advantages.

FIG. 3A shows a preferred embodiment of the device 58, in which it is separable into at least two parts, 58L and 58R, to facilitate easy installation without having to disconnect the belt to thread it through the device. Such easy assembly is accomplished by forming loop 59 (as depicted in a preceding figure) formed manually about three fingers of one hand, and sliding the loop onto belt binding member 53R and through belt channels 52R and 54R, thus mounting the right half of the device. Vertical belt portion 30 may then be placed in belt deflection means 56R thus deflecting the belt. Finally, opposing device half 58L is joined to its mate 58R by means such as screw 300, which goes into threaded hole 310. Pin and socket means 67, 68, 69 may also assist in the assembly and integrity of device 58. Note that belt deflection means 56 are angled in relation to the device, as shown at 196 in FIG. 8

FIG. 4 shows a preferred embodiment of the device in which a aperture 430 in device binding member 53 provides access to belt channels 52 and 54 and in which further aperture 400 provides access to deflection means 56. Apertures 430 and 400 eliminate any need to disconnect the belt from the auto to thread the belt through the apertures of the device. They also permit easy installation and removal of the device, yet do not compromise its safety. Apertures 430 and 400 may be closed with a plug means 410. For example, plug 410 is shown installed, closing aperture 400. Aperture 430 may be plugged similarly.

FIG. 5 shows an alternative embodiment of the device 58 implemented in a device body segment 510 and a device side segment 500, such that the device 58 may be easily joined about vertical belt portion 30 and shoulder belt portion 10 as described in connection with FIG. 3A, above. The two device segments 500 and 510 may be held together by means such as snap means 550, located on main body 510 and body cap 500. FIG. 6 shows an alternative unitary embodiment of the device 58. Such an embodiment will be useful when it is possible to thread the vertical and shoulder belt portions directly through the device, as during factory assembly or when it is otherwise desirable to disconnect the belt to install the device 58.

FIG. 7 and FIG. 7A show a front and side view of another embodiment of the device which allows a rotatable bar means 384 to function as a sort of a "gate", thereby permitting easy installation while open, safety while closed. Rotatable retention means 693 retains bar means 384.

Figure 8A:
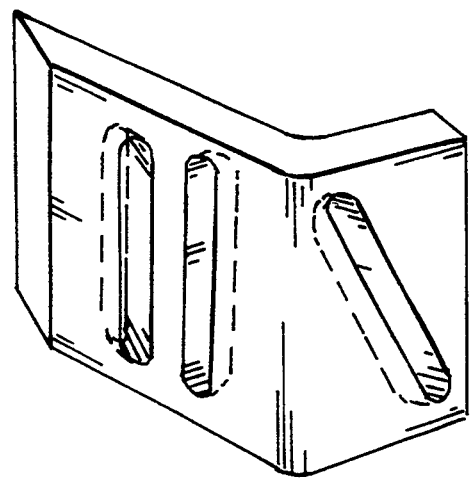
FIGS. 8A and B are perspective views of the device of FIG. 8 from the front and rear, respectively.
Figure 8B:
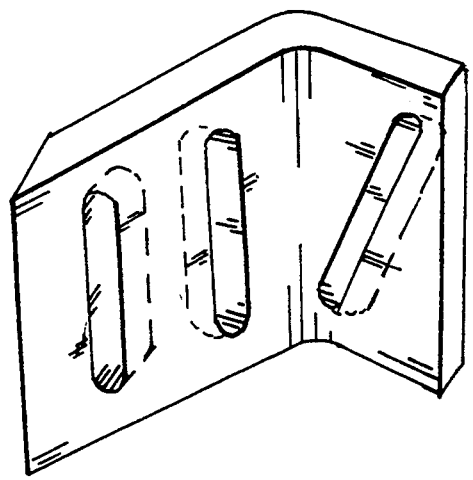
FIG. 8 is a perspective view of a preferred embodiment of the device, in use on a belt.
Figure 8:
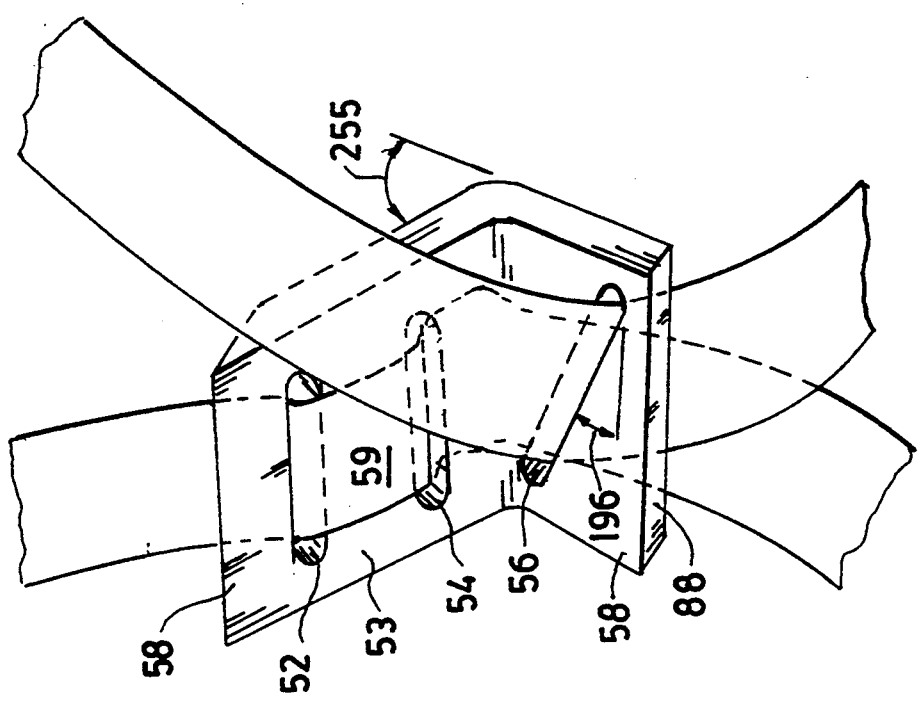

FIG. 8 shows torsional adjustment or orientation means 196 associated with deflection means 56, such that shoulder belt portion is turned as it is deflected, to better orient it for better contact and restrain of and against the chest of the occupant. Note that the angle beta depicted in arc at 196 is selected to fit the particular auto and passenger. FIG. 8 also shows the device 58 as elbowed or L-shaped, having deflection disposing means comprising elbow 255 of angle alpha so as to better dispose the deflection means away from the mounting means. This disposing means may a more acute elbow, or may even bend so as to place the deflection means above or adjacent the mounting means.

Thus the reader will see that the present invention provides a safe, effective method and apparatus for adjusting auto seat belts so as to fit users of varying sizes, which is furthermore compatible with existing seat belt systems and which requires no connection to, or modification of, the car interior.

While the foregoing description contains many specificities, these should not be construed as limitations on the scope of the invention, but rather as an exemplification of one preferred embodiment thereof. Many other variations will be apparent to one skilled in the art. Accordingly, the scope of the invention should be determined by the appended claims and their legal equivalents.

We claim:

1. A device for adjusting a shoulder belt portion of a seat belt having an upwardly extending vertical belt portion and downwardly extending shoulder belt portion which forms a loop at a vertical transition member, which device comprises a body having a plurality of channels for receiving the seat belt, at least a pair of which are for threadably receiving the vertical belt portion therethrough for adjustably positioning said body at a desired vertical position with respect to an occupant seated on a seat adjacent to a side of which the vertical belt portion is disposed; another of said channels being spaced from said pair of channels for threadably receiving the shoulder section after it passes around the loop formed at the vertical transition member, said other of said channels for deflecting the shoulder belt portion to define an angle having a vertex on the body which extends across the center of the chest region of the occupant seated on the seat, wherein said pair of channels is substantially horizontal and the other of said apertures is tilted with respect to said pair of channels, and wherein said pair of channels extend through said body and are inclined toward each other inside the body.

2. The device as claimed in claim 1 wherein said other channel is disposed adjacent to and vertically spaced from one of said pair of channels.

3. The device according to claim 2 wherein said one of said pair of channels is below the other of said pair of channels.

4. The device according to claim 1, wherein said body has a region containing the pair of channels and an end region extending from said region containing said pair of channels and bent with respect thereto, said tilted region containing said other channel and wherein said device is designed to operate with the shoulder section anchored at a lower end thereof adjacent the side of said seat opposite to said side adjacent to which said vertical section is disposed.

5. The device according to claim 1 wherein said pair of channels are interconnected by a slot for insertion of the vertical belt portion in the threading thereof through said pair of channels.

6. The device according to claim 5 further comprising a slot extending from said other of said channels exiting through one end of said body for insertion of the shoulder belt portion in the threading thereof through said other of said channels.

7. The device according to claim 1 wherein said body and said channels define means for binding the belt upon the positioning thereof.

8. A device for adjusting a shoulder belt portion of a seat belt having an upwardly extending vertical belt portion and a downwardly extending shoulder belt portion which forms a loop at a vertical transition member, which device comprises a body having a plurality of channels for receiving the seat belt, at least a pair of which are for threadably receiving with vertical belt portion for adjustably positioning said body at a desired vertical position with respect to an occupant seated on a seat adjacent to a side of which the vertical belt portion is disposed, another of said channels being spaced from said pair of channels for threadably receiving the shoulder section after it passes around the loop formed at the vertical transition member, said other of said channels for deflecting the shoulder belt portion to define an angle having a vertex on said body which extends across the center of the chest region of the occupant seated on the seat, wherein said body is a bi-part assembly split along a parting line extending across said plurality of channels, said assembly including means for assembling the parts thereof together at said parting line after the vertical and shoulder belt portions are threaded through said channels.

9. The device according to claim 8 wherein said means for assembling comprise a body segment extending along a side of said body.

10. The device according to claim 9 wherein said body segment is pivotally connected to said body.

11. The device according to claim 8 wherein said channels define means for binding the belt upon the positioning thereof.

* * * * *